(12) United States Patent
Cho et al.

(10) Patent No.: US 8,999,559 B2
(45) Date of Patent: Apr. 7, 2015

(54) SECONDARY BATTERY

(75) Inventors: Ja-Kyung Cho, Yongin-si (KR);
Dae-Kyu Kim, Yongin-si (KR);
Chang-Bum Ahn, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 494 days.

(21) Appl. No.: 12/968,145

(22) Filed: Dec. 14, 2010

(65) Prior Publication Data
US 2011/0143190 A1     Jun. 16, 2011

(30) Foreign Application Priority Data
Dec. 15, 2009   (KR) .................. 10-2009-0124700

(51) Int. Cl.
| H01M 6/12 | (2006.01) |
| H01M 2/16 | (2006.01) |
| H01M 10/04 | (2006.01) |
| H01M 10/0565 | (2010.01) |
| H01M 4/62 | (2006.01) |
| H01M 10/052 | (2010.01) |

(52) U.S. Cl.
CPC .............. *H01M 4/622* (2013.01); *H01M 2/168* (2013.01); *Y02E 60/12* (2013.01); *H01M 10/0436* (2013.01); *H01M 10/052* (2013.01); *H01M 10/0565* (2013.01)

(58) Field of Classification Search
CPC .................................................. H01M 2/168
USPC .............. 429/94, 130, 162, 164, 217, 231.95, 429/232, 246, 247, 250, 243
See application file for complete search history.

(56) References Cited

U.S. PATENT DOCUMENTS

| 3,298,871 | A | 1/1967 | Binder et al. |
| 6,291,102 | B1 | 9/2001 | Yoshida et al. |
| 2002/0192544 | A1* | 12/2002 | Kodama ........................ 429/175 |
| 2003/0232243 | A1 | 12/2003 | Hong |
| 2003/0235756 | A1* | 12/2003 | McCarley et al. ............ 429/185 |
| 2005/0058889 | A1* | 3/2005 | Goishihara ..................... 429/94 |
| 2005/0266302 | A1 | 12/2005 | Kim |
| 2006/0040179 | A1 | 2/2006 | Bang |
| 2006/0099510 | A1* | 5/2006 | Naarmann et al. ............ 429/232 |

FOREIGN PATENT DOCUMENTS

CN            1179016 A        4/1998
(Continued)

OTHER PUBLICATIONS

Google english translation of JP 2004228078 A, Published Date Aug. 2004, Obtained Aug. 14, 2013.*
Korean Office Action dated Apr. 18, 2011 for Korean Patent Application No. KR 10-2009-0124700 which corresponds to captioned U.S. Appl. No. 12/968,145.
(Continued)

*Primary Examiner* — Milton I Cano
*Assistant Examiner* — Jimmy K Vo
(74) *Attorney, Agent, or Firm* — Knobbe Martens Olson & Bear LLP

(57) ABSTRACT

A secondary battery is disclosed. The secondary battery includes an adhesive configured to attach to the electrode plates so as to strengthen the battery against separation, to reduce production of dust, and to protect the battery from dust.

17 Claims, 7 Drawing Sheets

(56) References Cited

FOREIGN PATENT DOCUMENTS

| | | | |
|---|---|---|---|
| CN | 1705145 A | | 12/2005 |
| CN | 1728414 A | | 2/2006 |
| EP | 1 202 371 A1 | | 5/2002 |
| JP | 11-213980 A | | 8/1999 |
| JP | 2002-157997 A | | 5/2002 |
| JP | 2003-132951 A | | 5/2003 |
| JP | 2003-187874 A | | 7/2003 |
| JP | 2003-208885 (A) | | 7/2003 |
| JP | 2003-223933 A | | 8/2003 |
| JP | 2004228078 A | * | 8/2004 |
| JP | 2008-226668 (A) | | 9/2008 |
| KR | 20-0391690 Y1 | | 7/2005 |
| KR | 20-0406077 Y1 | | 1/2006 |
| KR | 10-2006-0112821 A | | 11/2006 |
| KR | 10-2008-0090769 (A) | | 10/2008 |
| KR | 10-2009-0017706 (A) | | 2/2009 |
| WO | WO 99/31748 A1 | | 6/1999 |
| WO | WO 99/48164 A1 | | 9/1999 |

OTHER PUBLICATIONS

Korean Notice of Allowance dated Nov. 29, 2011 for Korean Patent Application No. KR 10-2009-0124700 which corresponds to captioned U.S. Appl. No. 12/968,145.

Japanese Office Action dated Aug. 7, 2012 for Japanese Patent Application No. 2010-097882 which shares priority of Korean Patent Application No. KR 10-2009-0124700 with captioned U.S. Appl. No. 12/968,145.

Chinese Office Action dated Nov. 11, 2013 for Chinese Patent Application No. 201010590033.8, which shares priority of Korean Patent Application No. KR 10-2009-0124700 with captioned U.S. Appl. No. 12/968,145.

Extended European Search Report dated Apr. 7, 2011 for European Patent Application No. EP 10 195 076.4 which shares priority of Korean Patent Application No. KR 10-2009-0124700 with captioned U.S. Appl. No. 12/968,145.

Chinese Letters Patent Serial No. 1465477 issued Aug. 20, 2014 which shares priority of Korean Patent Application No. KR 10-2009-0124700 with captioned U.S. Appl. No. 12/968,145.

* cited by examiner

SECONDARY BATTERY

CROSS-REFERENCE TO RELATED APPLICATIONS

This application claims priority to and the benefit of Korean Patent Application No. 10-2009-0124700, filed on Dec. 15, 2009, in the Korean Intellectual Property Office, the entire content of which is incorporated herein by reference.

BACKGROUND

1. Field

The field relates to a secondary battery, and more particularly, to a secondary battery capable of preventing the separation of an active material and increasing the adhesive force between electrode plates and a separator.

2. Description of the Related Technology

As the miniaturization and weight reduction of portable electronic devices make rapid progress, many studies have been conducted to develop secondary batteries used as power sources of the portable electronic devices. Such a secondary battery may, for example, be a nickel-cadmium battery, a nickel-hydrogen battery, a nickel-zinc battery, a lithium secondary battery and the like.

The lithium secondary battery is rechargeable, compact and has high capacity, and thus is widely applied to high-tech electronic devices because of its high operating voltage and high energy density per unit weight.

Such a lithium secondary battery is manufactured by inserting an electrode assembly together with an electrolyte into a case and then sealing the top of the case. The electrode assembly includes a positive electrode plate and a negative electrode plate, on which an active material is coated, and a separator interposed therebetween.

However, in the lithium secondary battery, a swelling phenomenon is easily generated by a reaction which generates gas in the manufacturing process of the lithium secondary battery, particularly, the reaction may occur in the process of electrolyte injection or charge/discharge. As a result of the swelling, the alignment of the electrode assembly is twisted, a short defect may occur or a non-discharge region may be produced.

Further, in the manufacturing of the lithium secondary battery, it is easy to generate dust of an active material in the process of notching or cutting the positive and negative electrode plates, in the process of fusing electrode tabs, and the like. Therefore, the short defect may occur.

SUMMARY OF THE INVENTION

The current embodiments address these problems and also have additional advantageous features.

One aspect is a secondary battery. The secondary battery includes an electrode assembly with a first electrode plate having a first electrode tab, a second electrode plate having a second electrode tab formed so as to not overlap the first electrode tab, and a separator interposed between the first and second electrode plates. The secondary battery also includes an electrolyte, a case for enclosing the electrode assembly and the electrolyte, and an adhesive attached to the first and second electrode plates and the separator.

Another aspect is a secondary battery. The secondary battery includes a case, and an electrode assembly in the case, where the electrode assembly includes a first electrode plate having a first electrode tab, a second electrode plate having a second electrode tab, and a separator interposed between the first and second electrode plates. The secondary battery also includes an adhesive attached to the first and second electrode plates and the separator, where the adhesive includes a material configured to become adhesive upon exposure to an electrolyte, and an electrolyte contacting the first electrode, the second electrode, the separator, and the adhesive.

BRIEF DESCRIPTION OF THE DRAWINGS

The accompanying drawings, together with the specification, illustrate exemplary embodiments, and, together with the description, serve to explain various inventive aspects.

DETAILED DESCRIPTION OF CERTAIN INVENTIVE EMBODIMENTS

Figure 1:
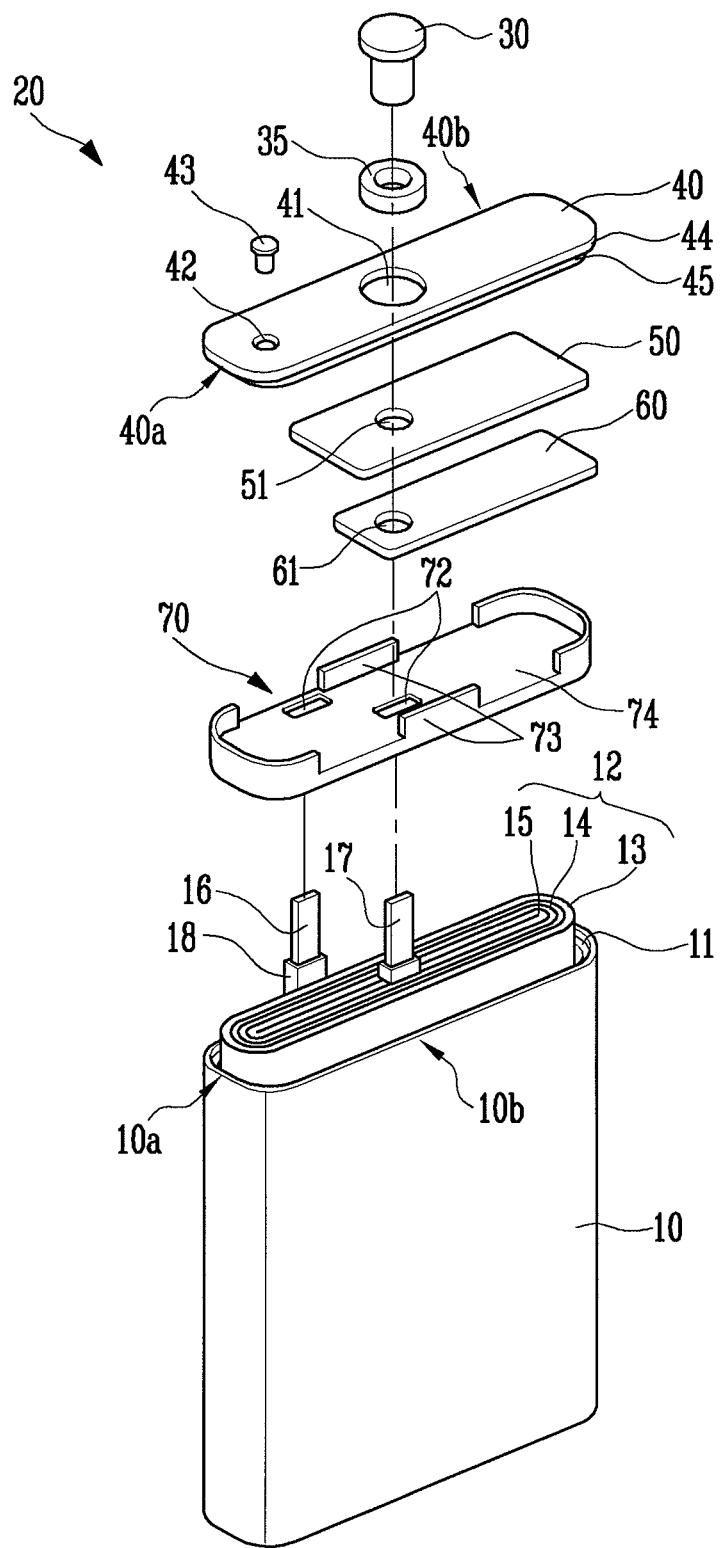
FIG. 1 is an exploded perspective view of a secondary battery according to an embodiment.

In the following detailed description, certain exemplary embodiments have been shown and described, simply by way of illustration. As those skilled in the art would realize, the described embodiments may be modified in various ways, without departing from the spirit or scope of the present invention. Accordingly, the drawings and description are to be regarded as illustrative in nature and not restrictive. In addition, when an element is referred to as being "on" another element, it can be directly on the other element or may be indirectly on the other element with one or more intervening elements interposed therebetween. Also, when an element is referred to as being "connected to" another element, it can be directly connected to the other element or may be indirectly connected to the another element with one or more intervening elements interposed therebetween. Hereinafter, like reference numerals generally refer to like elements.

Figure 2:
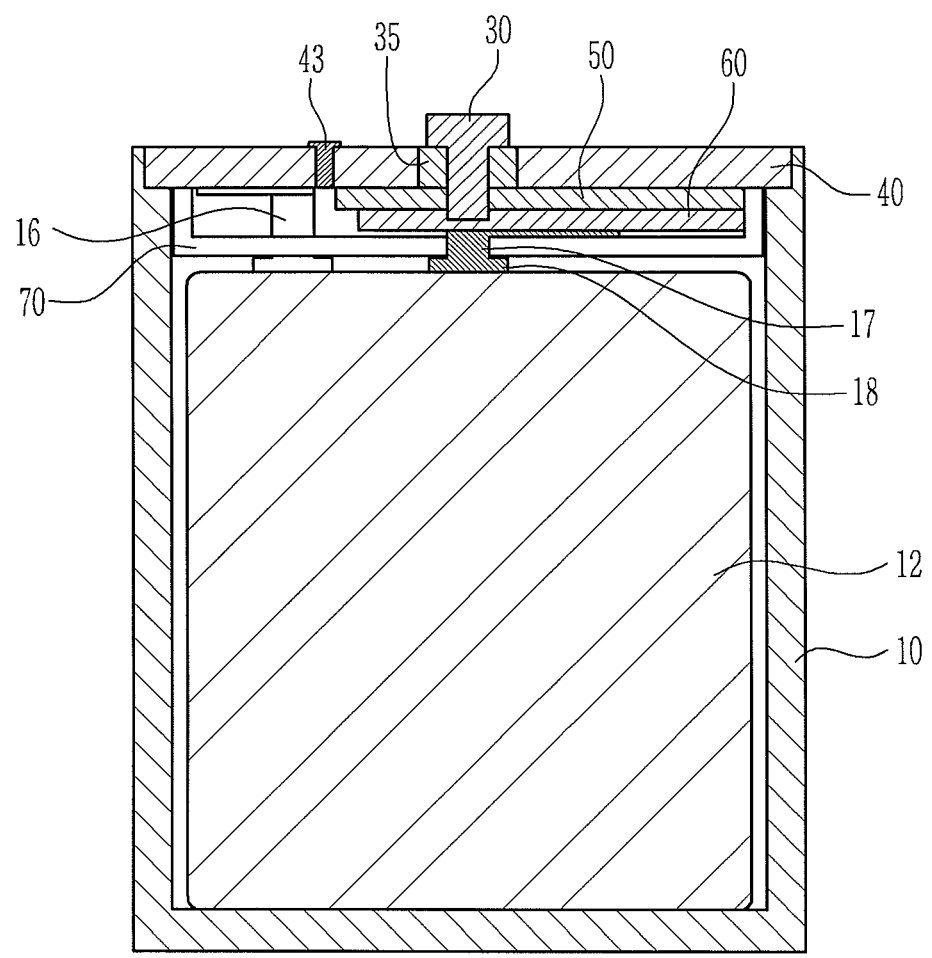
FIG. 2 is a cross-sectional view illustrating an embodiment of an assembled secondary battery of FIG. 1.

FIG. 1 is an exploded perspective view of a secondary battery according to an embodiment. FIG. 2 is a sectional view illustrating an embodiment of the assembled secondary battery of FIG. 1. In this embodiment, a secondary battery having a wound electrode assembly will be described as an example. The principles described may also be applied to secondary batteries having other structures.

Referring to FIGS. 1 and 2, the secondary battery of this embodiment includes an electrode assembly 12 and a case for enclosing an electrolyte together with the electrode assembly 12. The case has a can 10, a cap assembly 20 and an insulating case 70 positioned therebetween.

The electrode assembly 12 includes a first electrode plate 13, a second electrode plate 15 and a separator 14 interposed therebetween. The first electrode plate 13, the second electrode plate 15 and the separator 14 are wound as a jelly roll. Here, the first electrode plate 13 may be either of positive and negative electrode plates, and the second electrode plate 15 may be the other of the positive and negative electrode plates.

For example, if the first electrode plate 13 is a positive electrode plate, the second electrode plate 15 may be a negative electrode plate.

The first and second electrode plates 13 and 15 are manufactured by dry-coating an aluminum metal foil and a copper metal foil with a slurry. The slurry includes active materials for the first and second electrode plates 15 and 13 and a fixing agent for attaching the respective active materials to the metal foils. In the case of a lithium secondary battery, an oxide containing lithium may be used as a positive electrode active material, and any one of hard carbon, soft carbon, graphite and a carbon material may be used as a negative electrode active material. However, the present invention is not limited to a lithium secondary battery.

The first and second electrode plates 13 and 15 are respectively provided with first and second electrode tabs 16 and 17 protruding upward from the electrode assembly 12. The first and second electrode tabs 16 and 17 are spaced apart from each other so as to be electrically isolated from each other. A portion of each of the first and second electrode tabs 16 and 17 near the electrode assembly is wound with a lamination tape. The lamination tape 18 functions to block heat generated from the first or second electrode tab 16 or 17 and to prevent the electrode assembly 12 from being compressed by an edge of the first or second electrode tab 16 or 17.

The first and second electrode tabs 16 and 17 are electrically connected to the first and second electrode plates 13 and 15 of the electrode assembly 12, respectively. The first and second electrode tabs 16 and 17 extend in the direction in which the can 10 is opened. The first and second electrode tabs 16 and 17 are respectively electrically connected to the can 10 and a terminal plate 60 by respectively passing through lid through-holes 72 of the insulation case 70 fixed to the top of the electrode assembly 12 in the can 10.

The can 10 receives the electrode assembly 12 through an open side thereof. The horizontal section of the can 10 is formed in a substantially rectangular shape with rounded corners and includes a pair of short side portions 10a and a pair of long side portions 10b.

The shape of the can 10 is not limited thereto. For example, it will be apparent that the horizontal section of the can 10 may be formed in a rectangular shape, elliptical shape or the like. That is, although a generally rectangular prismatic secondary battery has been shown in this embodiment, the present invention is not limited thereto. For example, the secondary battery may be substantially cylindrical. In this case, the electrode assembly 12 may be wound in a cylindrical shape.

The can 10 may be formed of a metallic material, e.g., aluminum or aluminum alloy, which is light and flexible. The can 10 may be easily manufactured using a deep drawing method.

A step portion is formed at the top of the can 10, and the cap assembly 20, which will be described later, is mounted on the step portion.

The cap assembly 20 includes a cap plate 40, an electrode terminal 30, an insulating plate 50, a terminal plate 60 and a gasket 35. When the cap assembly 20 is connected to the can 10, the cap plate 40 allows the opened surface of the can 10 to be sealed tightly, thereby forming one surface of the can 10. To this end, the cap plate 40 may be coupled to the opened surface of the can using a method such as welding.

Hereinafter, components of the cap assembly 20 will be described in detail.

The cap plate 40 is electrically connected to either of the first and second electrode tabs 16 and 17, which respectively pass through the lid through-holes 72 of the insulating case 70. A first terminal hole 41 for coupling the gasket 35 to the cap plate 40 and an electrolyte injection hole 42 for injecting an electrolyte are formed in the cap plate 40. The electrolyte injection hole 42 is formed in the cap plate 40 and is used as a passage to inject the electrolyte into the can 10. After the electrolyte is injected into the can 10, the electrolyte injection hole 42 is tightly sealed with a stopper 43.

The gasket 35 is used to secure insulation between the electrode terminal 30 and the cap plate 40. The first terminal hole 41 through which the electrode terminal 30 extends is formed in the cap plate 40, and the electrode terminal 30 is connected to the gasket 35 in the first terminal hole 41.

The insulating plate 50 is interposed between the cap plate 40 and the terminal plate 60 so that they are electrically isolated from each other. A second terminal hole 51 is formed at the insulating plate 50 so that the electrode terminal 30 can pass through the insulating plate 50.

The terminal plate 60 is electrically connected to the electrode terminal 30 through a third terminal hole 61. The terminal plate 60 is electrically connected to either the first or second electrode tab 16 or 17 whichever is not connected to the cap plate 40. That is, if the cap plate 40 is electrically connected to the first electrode tab 16, the terminal plate 60 is connected to the second electrode tab 17. As a result, the terminal plate 60 is electrically connected to the electrode terminal 30 and the second electrode tab 17.

The insulating case 70 is positioned between the electrode assembly 12 and the cap assembly 20 so that they are electrically isolated from each other. More specifically, the insulating case 70 is positioned in the top portion of the can 10. For example, corners of the insulating case 70 are formed in a rounded rectangular shape conforming to the horizontal sectional shape of the can 10 so that the insulating case 70 can be fitted into the can 10. Once fitted, short and long side portions 10a and 10b of the can 10 align with the short and long side portions 40a and 40b on the side 44 of the cap plate 40. In addition, the ridge 45 of the cap plate 40 engages the ridge 11 of the can 10.

The insulating case 70 is generally manufactured by using a light plastic resin with excellent electric insulation. Therefore, when the insulating case 70 is inserted into the can 10, the deformation of the insulating case 70 is minor, and it is easy to ensure insulation between the electrode assembly 12 and the cap assembly 20. However, when a light plastic resin is used for the insulating case 70, it is difficult to couple the insulating case 70 to the can 10 due to its low elasticity. Therefore, to solve such a problem, the insulating case 70 includes a base portion 74 and a support portion 73. As a result, the insulating case 70 can be stably coupled to the can 10. An electrolyte injection hole (not shown) and lid through holes 72 are formed at the base portion 74.

Although not shown in FIGS. 1 and 2, an adhesive changed by an electrolyte to have an adhesive property is attached to each of the first and second electrode plates 13 and 15. The adhesive strengthens the adhesive force between the first and second electrode plates and the separator. The detailed description of the adhesive will be described later with reference to FIGS. 3, 4A and 4B.

Figure 3:
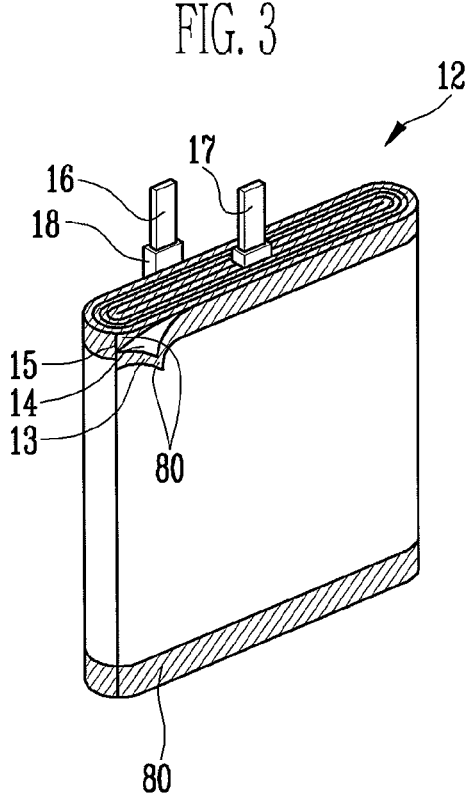
FIG. 3 is a perspective view illustrating an electrode assembly according to an embodiment.
Figure 4A:
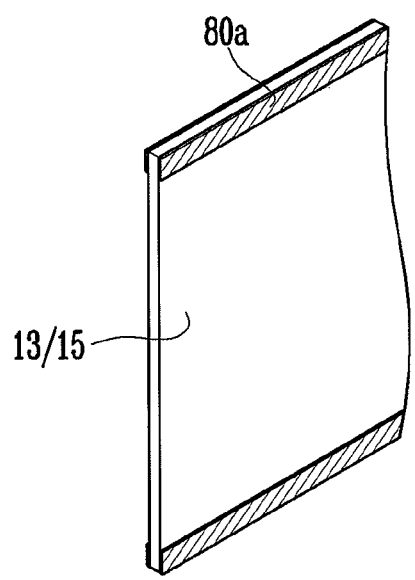
FIGS. 4A and 4B are perspective views of a main part illustrating examples in which an adhesive of FIG. 3 is attached to the main part.
Figure 4B:
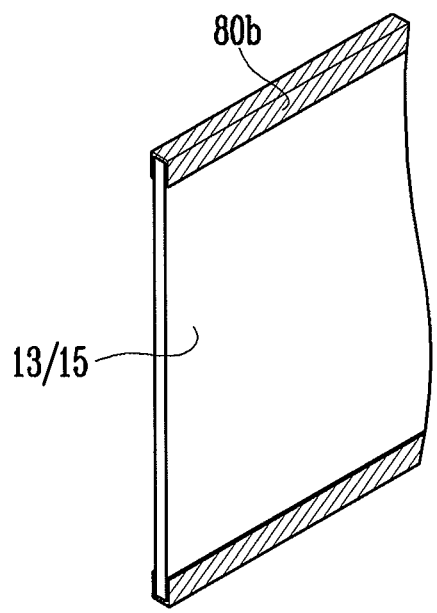

FIG. 3 is a perspective view illustrating an electrode assembly according to an embodiment. FIGS. 4A and 4B are perspective views of a main part illustrating examples in which an adhesive is attached to the main part. In FIGS. 3, 4A and 4B, the wound electrode assembly of FIG. 1 is described as an example.

Referring to FIG. 3, the electrode assembly 12 of this embodiment has a structure formed by winding a first electrode plate 13, a second electrode plate 15 and a separator interposed therebetween. In addition, an adhesive 80 is attached to each of the first and second electrode plates 13 and 15.

The adhesive 80 is made of a material, which, when exposed to the electrolyte becomes adhesive.

For example, a chemical change is produced at the surface that comes in contact with the electrolyte during the injection of the electrolyte, so that the adhesive 80 becomes adhesive. The adhesive may include an oriented polystyrene (OPS) adhesive film containing pores. Here, polymer materials include pores.

The surface of the OPS adhesive film is chemically changed by an electrolyte including dimethyl carbonate (DMC), ethyl methyl carbonate (EMC) and/or propylene carbonate (PC) so as to become adhesive. Since the OPS adhesive film has chemical and electrical safety, it can be applied to batteries.

During manufacturing, the electrode assembly 12 having the adhesive 80 attached to the first and second electrode plates 13 and 15 is inserted into a case. Then, when an electrolyte is introduced into the case, the adhesive 80 is chemically changed by the electrolyte to become adhesive. As a result, the adhesive 80 allows the first and second electrode plates 13 and 15 to tightly adhere to the separator 14, thereby strengthening the adhesive force between the first and second electrode plates 13 and 15 and the separator 14.

The adhesive 80 may be attached to at least one portion of each of the first and second electrode plates 13 and 15. For example, the adhesive 80 may be attached along edges of the first and second electrode plates 13 and 15. The adhesive 80 may be attached to both surfaces of each of the first and second electrode plates 13 and 15 so that the adhesive force can be uniformly and stably strengthened. That is, the adhesive 80 may be on the first and second electrode plates 13 and 15 on opposite sides of the separator 14.

For example, as illustrated in FIG. 3, the adhesive 80 may be attached to surfaces along upper and lower edges of each of the first and second electrode plates 13 and 15. The upper and lower edges of each of the first and second electrode plates 13 and 15 are regions at which dust may be easily produced as discussed above in a processes such as notching or cutting. For example, without the adhesive, when the first and second electrode tabs 16 and 17 are attached to the first and second electrode plates 13 and 15, respectively, dust may be easily produced at the upper and lower edges of each of the first and second electrode plates 13 and 15. However, when the adhesive 80 is attached to the upper and lower edges of each of the first and second electrode plates 13 and 15, the production of dust is significantly reduced, thereby effectively preventing short defects.

As illustrated in FIG. 4A, the adhesive 80a may be attached to both surfaces of each of the first and second electrode plates 13 and 15. Alternatively, as illustrated in FIG. 4B, the adhesive 80b may be attached to both surfaces of each of the first and second electrode plates 13 and 15 and additionally placed on the edge of the first and second electrode plates 13 and 15. Accordingly, in some embodiments, the adhesive 80b surrounds the edges of the first and second electrode plates 13 and 15.

The adhesive 80 may be attached before and/or after the notching or cutting process of the first or second electrode plate 13 or 15. If the adhesive 80 is attached before the notching or cutting process, it may be attached to both surfaces of the first or second electrode plate 13 or 15 as illustrated in FIG. 4A. If the adhesive 80 is attached after the notching or cutting process, it may be attached to surround the edges on both surfaces of the first or second electrode plate 13 or 15 as illustrated in FIG. 4B. Also, if the adhesive 80 is attached after the notching or cutting process, it may be attached to both surfaces of the first or second electrode plate 13 or 15, and not attached to the edges.

As described above, according to this embodiment, the adhesive 80, which is changed by an electrolyte to become adhesive, is attached to the first and second electrode plates 13 and 15. The adhesive 80 attaches to the first and second electrode plates 13 and 15 and the separator 14 after the electrolyte is injected, thereby strengthening the adhesive force between the first and second electrode plates 13 and 15 and the separator 14. Accordingly, the alignment and the relative positioning of the components of the electrode assembly 12 can be stably maintained.

Particularly, when the adhesive 80 is at least attached along the upper and lower edges of the first and second electrode plates 13 and 15, dust of an active material and dust produced in the process of fusing the electrode tabs is prevented from generating shorts because the adhesive 80 prevents separation of the active material.

For convenience of illustration, only one sheet of separator 14 is interposed between the first and second electrode plates 13 and 15 of FIG. 3. However, another separator (not shown) may be further provided at an outer portion of the electrode assembly 12, e.g., an outer portion near the first electrode plate 13. In this case, the electrode assembly 12 may be formed by winding the second electrode plate 15, the separator 14, the first electrode plate 13 and the another separator such that they are sequentially stacked. A finishing tape (not shown) may be further attached to the wound electrode assembly 12.

Figure 5:
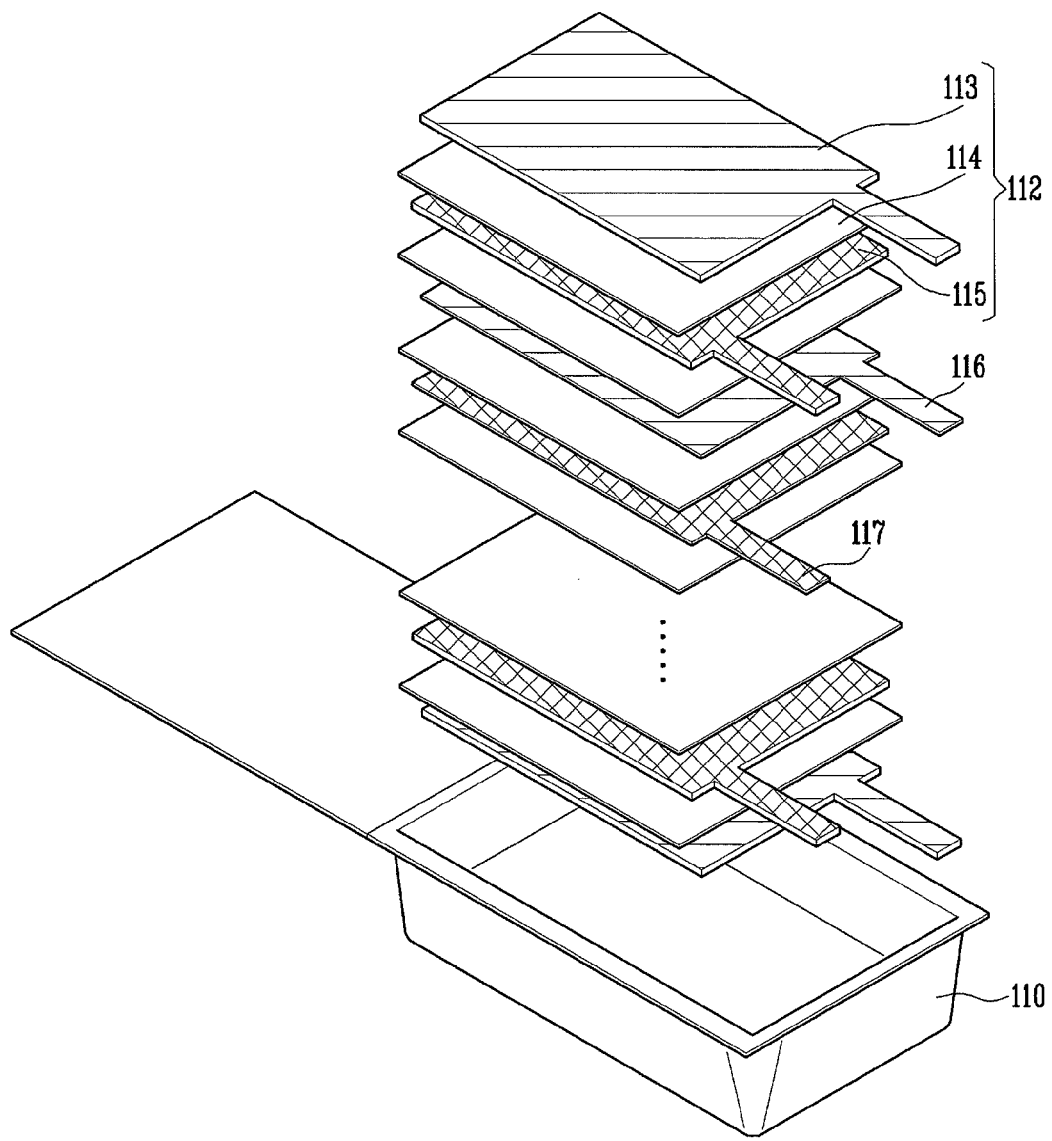
FIG. 5 is an exploded perspective view of a secondary battery according to another embodiment.
Figure 6A:
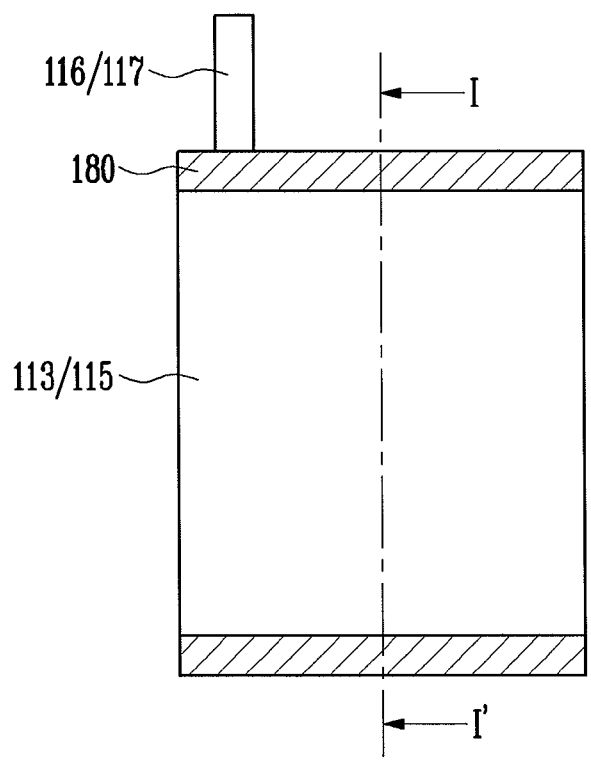
FIGS. 6A to 6C are plan views of an electrode plate illustrating an electrode assembly according to an embodiment.
Figure 6B:
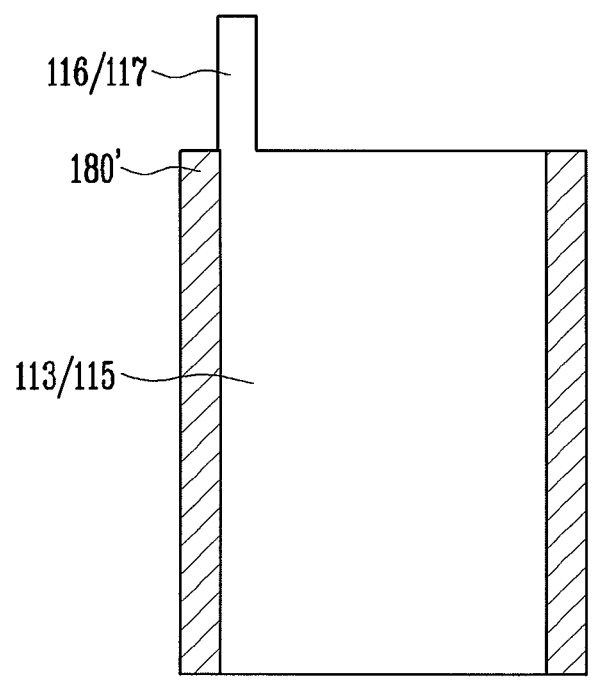
Figure 6C:
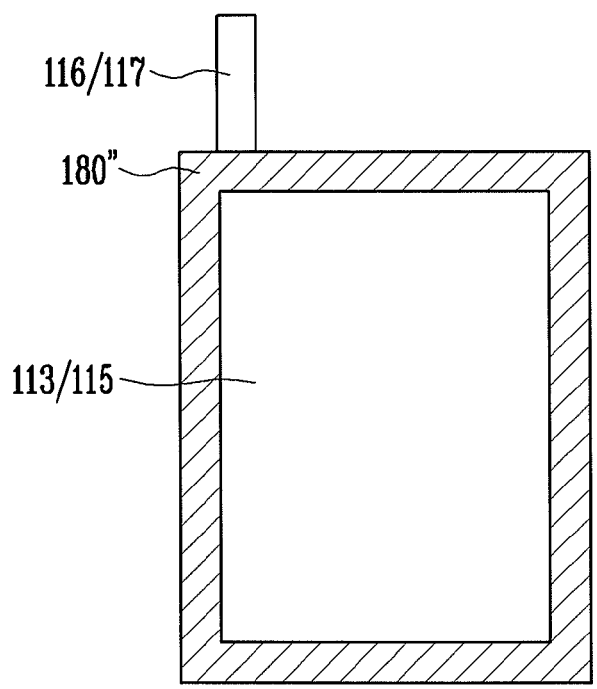
Figure 7A:
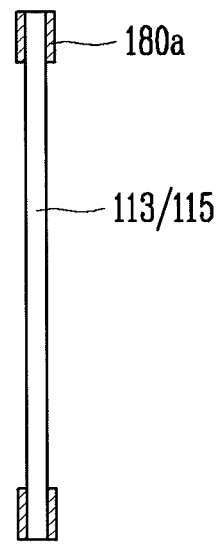
FIGS. 7A and 7B are cross-sectional views of a main part illustrating examples in which adhesives of FIGS. 6A to 6C are attached to the main part.
Figure 7B:
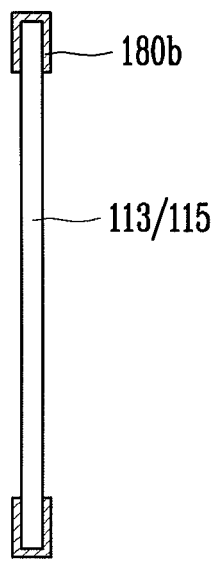

FIG. 5 is an exploded perspective view of a secondary battery according to another embodiment. Components of the embodiment of FIG. 5 corresponding to components of the embodiment of FIG. 1 may have similar or identical features. FIGS. 6A to 6C are plan views of an electrode plate illustrating an electrode assembly according to an embodiment. FIGS. 7A and 7B are cross-sectional views of a main part illustrating examples in which adhesives of FIGS. 6A to 6C are attached to the main part. In this embodiment, the secondary battery using a stacked electrode assembly will be described as an example.

Referring to FIG. 5, the secondary battery of this embodiment includes an electrode assembly 112 and a case 110 for holding an electrolyte with the electrode assembly 112. The case 110 is implemented as a pouch case.

The electrode assembly 112 has a plurality of structures formed by stacking first and second electrode plates 113 and 115 on which an active material is coated and a separator 114 interposed therebetween. A first electrode tab 116 is formed at one side of the first electrode plate 113, and a second electrode tab 117 is formed at one side of the second electrode plate 115. The first and second electrode tabs 116 and 117 are formed so as overlap like tabs and to not overlap unlike tabs, as shown in FIG. 5. The first and second electrode tabs 116 and 117 may be integrally formed by respectively extending from the first and second electrode plates 113 and 115 or may be separately formed to be respectively attached to the first and second electrode plates 113 and 115.

The first and second electrode plates 113 and 115 may be different from each other depending on the kind of secondary battery. However, the first and second electrode plates 113 and 115 may be formed by coating and filling a metallic material with an active material and then drying, roll-pressing and cutting the metallic material.

The separator 114 is interposed between the first and second electrode plates 113 and 115. An insulative thin film with a high ion transmittance and mechanical strength is used as the separator 114. The diameter of pores in the separator 114 may be from about 0.01 μm to about 10 μm, and the thickness of pores in the separator 114 is generally from about 5 μm to about 300 μm. The separator 114 may include an olefin-based polymer such as polypropylene with chemical resistance and hydrophobicity. The separator 114 may include a sheet or felt made of glass fiber or polyethylene, and the like. In some embodiments, if a solid electrolyte comprising a polymer is used, it may be substituted for the separator 114.

The case 110 is formed as a pouch case with a space for securing the electrode assembly 112. The case 110 is usually formed to have a stacked structure at upper and lower surfaces of an aluminum thin film, and the inner surface of the case 110 includes a heat adhesive resin.

In this embodiment, although not shown in FIG. 5, an adhesive changed by the electrolyte to become adhesive is attached to the first and second electrode plates 113 and 115. During introduction of the electrolyte, the adhesive adheres to the first and second electrode plates 113 and 115 and the separator 114, thereby strengthening the adhesive force between the first and second electrode plates 113 and 115 and the separator 114.

More specifically, as illustrated in FIGS. 6A to 6C, the adhesive 180 may be attached in the lateral direction along upper and lower edges of first and second electrode plates 113 and 115, or the adhesive 180' may be attached in the longitudinal direction along both side edges of first and second electrode plates 113 and 115. Alternatively, the adhesive 180'' may be attached to four sides along a circumference of the first and second electrode plates 113 and 115.

In this embodiment, the adhesives 180, 180' and 180'' may be attached to both surfaces of the first or second electrode plate 113 or 115 before and/or after the notch or cutting process of the first or second electrode plate 113 or 115. The adhesive 180a may be attached to both surfaces of each of the first and second electrode plates 113 and 115 as illustrated in FIG. 7A, or the adhesive 180b may be attached so as to surround the edges and contact both surfaces of each of first and second electrode plates 113 and 115. FIGS. 7A and 7B are cross-sectional views illustrating longitudinal sections taken along line I-I' of FIG. 6A, and show attachment examples of the adhesives illustrated in FIGS. 6A to 6C.

As described above, in this embodiment, the adhesive force between the first and second electrode plates 113 and 115 and the separator 114 can be strengthened by using the adhesive 180, 180' or 180'' changed by the electrolyte to become adhesive. Accordingly, the alignment and relative position of the components of the electrode assembly 112 can be stably maintained. The swelling phenomenon, and the production of a non-discharge region can be prevented.

Particularly, when the adhesive 180, 180' or 180'' is attached along edges of the first and second electrode plates 113 and 115, dust of an active material and dust produced in the process of fusing electrode tabs is prevented from generating shorts because the adhesive 80 prevents separation of the active material. While various aspects have been described in connection with certain exemplary embodiments, it is to be understood that the invention is not limited to the disclosed embodiments, but, on the contrary, is intended to cover various modifications and equivalent arrangements.

What is claimed is:

1. A secondary battery, comprising:
    an electrode assembly comprising:
        first and second electrode plates, and
        a separator interposed between the first and second electrode plates;
    an electrolyte;
    a case for enclosing the electrode assembly and the electrolyte;
    an adhesive precursor attached to the first and second electrode plates and the separator;
    wherein the adhesive precursor is immersed in the electrolyte to become an adhesive; and
    wherein the adhesive include an oriented polystyrene (OPS) adhesive film.

2. The secondary battery according to claim 1, wherein the adhesive is attached along opposing surfaces near edges of each of the first and second electrode plates.

3. The secondary battery according to claim 1, wherein the adhesive is attached along opposing sides on a surface of at least one of the first and second electrode plates.

4. The secondary battery according to claim 3, wherein the adhesive is attached in the lateral direction along upper and lower edges of each of the first and second electrode plates.

5. The secondary battery according to claim 3, wherein the adhesive is attached in a longitudinal direction along both side edges of each of the first and second electrode plates.

6. The secondary battery according to claim 3, wherein the adhesive is attached to surround at least one edge of the first and second electrode plates.

7. The secondary battery according to claim 1, wherein the first electrode plate, the second electrode plate and the separator are stacked.

8. The secondary battery according to claim 7, wherein the adhesive is attached in a longitudinal direction along both side edges of at least one of the first and second electrode plates.

9. The secondary battery according to claim 7, wherein the adhesive is attached in the lateral direction along the upper and lower edges of at least one of the first and second electrode plates.

10. The secondary battery according to claim 7, wherein the adhesive is attached along an edge of at least one of the first and second electrode plates.

11. The secondary battery according to claim 9, wherein the adhesive is attached to surround the edge of at least one of the first and second electrode plates.

12. A secondary battery, comprising:
    a case;
    an electrode assembly in the case, the electrode assembly comprising:
        a first electrode plate having a first electrode tab,
        a second electrode plate having a second electrode tab, and
        a separator interposed between the first and second electrode plates;
    an adhesive precursor attached to the first and second electrode plates and the separator, wherein the adhesive precursor comprises a material configured to become an adhesive upon immersion in an electrolyte;
    the electrolyte contacting the first electrode, the second electrode, the separator, and the adhesive; and
    wherein the adhesive comprises an oriented polystyrene (OPS) film.

13. The secondary battery according to claim 12, wherein the adhesive is attached along opposing surfaces near edges of each of the first and second electrode plates.

14. The secondary battery according to claim 13, wherein the adhesive is attached in the lateral direction along upper and lower edges of each of the first and second electrode plates.

15. The secondary battery according to claim 13, wherein the adhesive is attached to surround at least one edge of the first and second electrode plates.

16. The secondary battery according to claim 12, wherein the adhesive is attached along opposing sides on both surfaces of each of the first and second electrode plates.

17. The secondary battery according to claim 12, wherein the first electrode plate, the second electrode plate and the separator are stacked.

* * * * *